United States Patent [19]

Schaap

[11] 4,026,349

[45] May 31, 1977

[54] COWL FOR AN INDUSTRIAL ELECTRIC TRUCK

[76] Inventor: Robert E. Schaap, 12606 Shirley St., Omaha, Nebr. 68144

[22] Filed: Mar. 15, 1976

[21] Appl. No.: 667,061

[52] U.S. Cl. .................................. 165/41; 165/107; 98/1; 361/384

[51] Int. Cl.$^2$ .......................................... B60H 1/28

[58] Field of Search .................. 174/16 R; 317/100; 98/2.16, 1 R; 165/41, 107

[56] References Cited

UNITED STATES PATENTS

| 2,319,035 | 5/1943 | Breese | 98/2.16 |
| 2,789,007 | 4/1957 | Howell | 98/2.16 X |
| 3,732,801 | 5/1973 | Wallis | 98/2.16 X |

Primary Examiner—William E. Wayner
Assistant Examiner—William E. Tapolcai, Jr.
Attorney, Agent, or Firm—Henderson, Strom & Sturm

[57] ABSTRACT

A cowl for an industrial electric truck formed in three compartments of which two are sealable and interconnected by conduits for conveying air therebetween. The first compartment is provided to contain the silicon controlled rectifier, the third is provided to contain the electro-mechanical equipment, and the interconnecting compartment provides protection for the legs, knees and feet of an operator. The walls of the cowl are formed of heat conducting material, and a fan is used to transfer cool air from the third to the first compartment to cool the SCR and to transfer hot air from the first to the third compartment to heat the electro-mechanical equipment thus providing a cowl for use in a hostile environment.

8 Claims, 6 Drawing Figures

COWL FOR AN INDUSTRIAL ELECTRIC TRUCK

BACKGROUND OF THE INVENTION

Electric trucks include a wheel supported chassis, an electro-mechanical control unit, a silicon controlled rectifier, an hydraulic unit, an electric motor and a power pack. Mounted in or on a standard cowl, which is a portion of the chassis, are the silicon controlled rectifier, the operating pedals, brake cylinder, hydraulic units, and the electro-mechanical control units comprising circulating fan, hoist and directional contacts, potentiometer, fuses, terminals, cut out switches, and meter and indicators. Under normal operating conditions in a normal environment, the silicon controlled rectifier or SCR and the electro-mechanical units are exposed to the atmosphere as the SCR generates heat, which heat must be dissipated.

In the packing and/or freezing industry, the electric truck is operated under extremely cold conditions and in many cases there is a considerable amount of brine. Under the cold conditions, the electro-mechanical unit utilizes heaters to keep the equipment operable and dry. However, under brine condition, the SCR equipment and connections and the electro-mechanical unit and connections become corroded thus ultimately requiring the truck to be completely overhauled to prevent complete destruction to various components of the truck.

During overhaul or cleaning, the electric truck is out of service and either additional equipment must be made available or revised operating schedules must be utilized until the equipment is again operable.

It has also been found that a standard or conventional electric truck can contaminate the environment of a packing plant freezer and it therefore would be desirable to mount as much equipment as possible in controlled compartments wherein contamination can be held to a minimum or eliminated. Furthermore, the exterior of uncontrolled compartments cannot readily be worked by steam or hot water because of the effect of water on electrical equipment.

There are a number of hostile environments other than cold temperatures or brine; for example, carbon black dust and aluminum dust or fumes. These dusts are conductive and contaminative, and as such, create short circuits in the silicon collector rectifier, in electronic gear, and in the electro-mechanical gear. An investigation of the art fails to disclose any attempt to alleviate the problems set out above.

SUMMARY OF THE INVENTION

This invention relates to the cowl of an electric truck. The cowl is formed in three compartments with the first designed to contain the silicon controlled rectifier, the third is designed to contain the electro-mechanical units and the second is designed to contain auxiliary equipment. The three compartments are substantially formed from heat conducting materials with the first and third having openings which are gasket sealed with covers and the second is substantially open. Interconnecting the first and third compartments are circulating passages for transferring air from one compartment to the other. Because the compartments are gasket tight, the cowl can be washed down with steam or hot water to remove brine and grime without the possibility of injury to the electrical and mechanical gear.

It is, therefore, an object of this invention to provide a cowl for an electric truck which is adapted for use in a hostile environment.

Another object of this invention is to provide an improved cowl formed substantially from a heat transferring or conducting material wherein heat generated by equipment mounted in the cowl is conducted to the outer surface for dissipation into the atmosphere.

A further object of this invention is to provide a cowl which is economical of manufacture, durable in use and extremely effective in a hostile environment.

Yet another object of the invention is the provision of a sealable cowl for an industrial truck which can readily be cleaned and/or decontaminated by the use of steam or hot water without affecting electrical and mechanical equipment mounted therein.

A still further object of this invention is to provide a sealable cowl for an industrial truck wherein equipment which can contaminate an atmosphere is mounted in sealable compartments for the purpose of protecting the environment in which the truck is operated, and wherein equipment which can be damaged or contaminated by the atmosphere in which it is used can be mounted in sealable compartments for the protection of same.

DESCRIPTION OF THE PREFERRED EMBODIMENT

Figure 1:
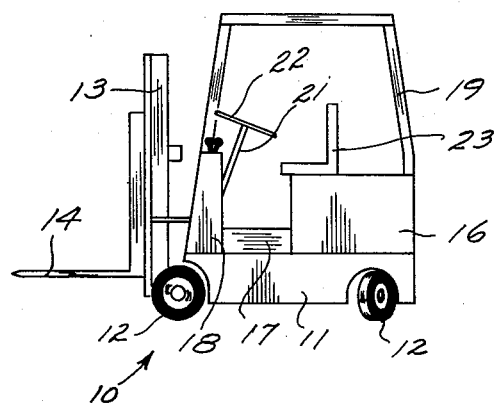
FIG. 1 is a side view of an electric truck containing the cowl of this invention.

Referring now to the drawings, an electric truck is depicted generally at 10 in FIG. 1. The truck 10 includes a chassis 11 supported on a four wheels 12 (only 2 on the left side being shown), wherein at least two of the wheels are operably connected to electric motors (not shown). A mast 13 and fork lift 14 are mounted on the forward end of the chassis 11 and the fork lift is operably connected to a hydraulic unit only partially described hereinafter. Mounted on the rear portion of the chassis is the battery compartment 16. Connected to the battery compartment is a cable compartment 17 and mounted forwardly of the cable compartment is the cowl 18 of this invention. Disposed over the chassis is a roof unit 19 which connects on the forward end to the cowl and on the rear end to the battery compartment. Operably connected to the chassis proximate the cowl is a steering column 21 and wheel 22. Disposed on the battery compartment is a seat 23.

Figure 2:
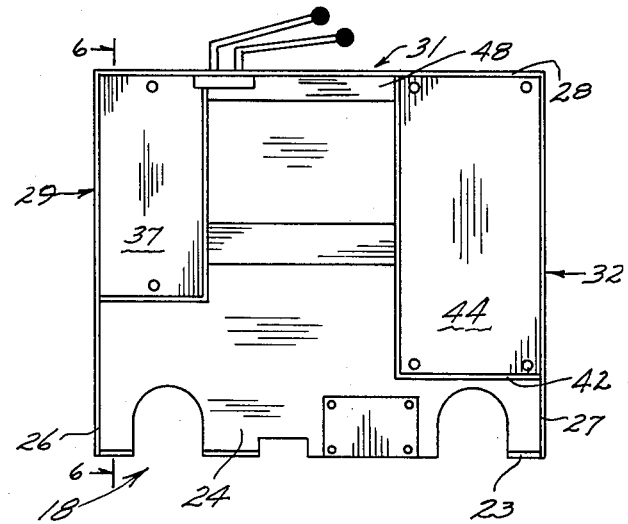
FIG. 2 is a rear elevational view of the cowl.
Figure 3:
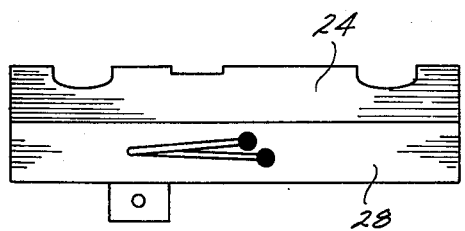
FIG. 3 is a top plan view thereof.
Figure 4:
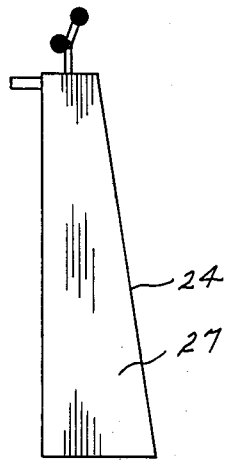
FIG. 4 is a right side elevational view thereof.

The cowl 18 includes a horizontally disposed wall 23 (FIGS. 2 and 4) mounted on the chassis, an inclined generally vertically disposed front wall 24 welded on its bottom and to the base wall 23, spaced side walls 26 and 27 welded to the base wall and front wall, and a generally horizontally disposed top wall 28 welded to the front wall and side walls. The cowl is divided into three compartments 29, 31 and 32.

Figure 5:
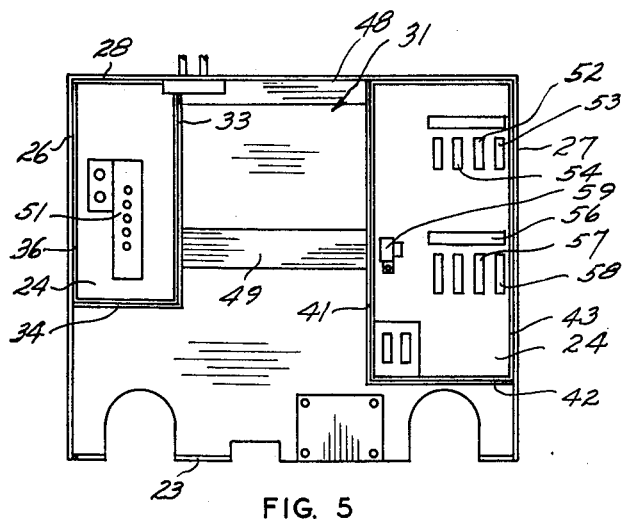
FIG. 5 is a rear elevational view with the compartments open.
Figure 6:
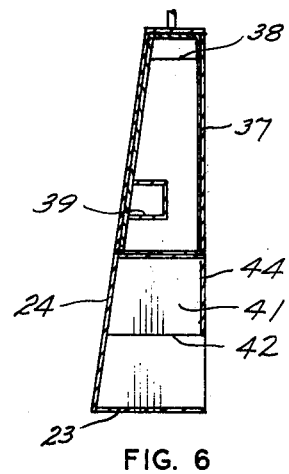
FIG. 6 is a sectional view taken along the lines 5—5 in FIG. 2.

The first compartment 29 (FIGS. 2 and 5) is formed from a portion of the top wall 28, the left side wall 26, a portion of the front wall 24, a first compartment side wall 33 and a first compartment base walls 34, which walls form an open compartment. Disposed around the open ends of the walls is a gasket 36 (FIG. 5) and disposed over the gasket and sealing the opening is a first compartment cover 37. A top slot 38 and a bottom hole 39 are formed in the first compartment wall 33 (FIG. 5).

Spaced from the first compartment 29 (FIGS. 2 and 5) is the third compartment 32 and the latter is formed from a portion of the top and front base walls, the right side wall 27, a third compartment side wall 41 and a third compartment unit base wall 42. The rear is open and is sealable with a second gasket 43 and a third compartment cover 44. Formed in the third compartment wall 41 is a top slot 46 and a bottom hole 47 which holes are in substantially vertical or horizontal alignment with their counterparts in the first compartment wall 33.

Disposed between the first and third compartments is the second compartment 31 (FIGS. 2 and 5) which is formed by the mid portions of the top, front and base walls, and the first and third compartment walls 33 and 41. Mounted in and interconnecting the top slots 38 and 46 is a conduit 48 and interconnecting the bottom holes 39 and 47 is a second conduit 49. Each of the conduits are welded on their ends to the first and third compartment side walls thus effectively sealing the compartments. The walls described and referred to hereinabove are formed from heat conducting materials; i.e., steel.

Mounted in the first compartment is a silicon controlled rectifier 51 which under normal operating conditions generates considerable heat. The third compartment contains switches 52, indicators 53, hoist and directional contacts 54, potentiometer 56, fuses 57 and terminals 58. Also mounted in the third compartment proximate the bottom hole 47 is a circulating fan 59 for moving air from the third compartment through the second conduit 49 and into the first compartment. This movement of air in turn forces hot air from the first compartment through the first conduit into the third compartment. The hot air dries and heats the electromechanical equipment in the third compartment and cooler air transferred to the first compartment by the fan cools the SCR. Excess heat is conducted by the heat conducting walls to the outer surface wherein it is dissipated to the atmosphere.

The second compartment 31 (FIG. 2) contains encapsulated and other auxiliary equipment which do not require protection from the elements and provides a protective area for the feet, knees and legs of an operator.

In use the cowl can be washed with steam or hot water and as the first and third compartments are gasket sealed, the gear contained therein cannot be harmed nor can any contaminants on the gear be readily transferred to the environment.

The first and third compartments have sealable passages formed in their side walls to permit the entrance and exit of cables and tubing for electric lines and hydraulic fluid. Each passage around the cable and/or tubing is then sealed to prevent contamination or the like of the gear within the compartment or of the environment around the compartment.

I claim:

1. A cowl for an industrial truck comprising:
a first compartment having an opening formed therein, said compartment having at least one side wall and said side wall having a hole and a slot formed therein;
a first compartment cover removably attached to said first compartment over said opening for sealing said first compartment;
a second compartment disposed adjacent said first compartment side wall;
a third compartment spaced from said first compartment and disposed adjacent said second compartment, said third compartment having an opening formed therein and further having at least one third compartment side wall spaced from said first compartment side wall with said second compartment disposed therebetween, said third compartment side wall having a hole and a slot formed therein;
a third compartment cover removably secured to said third compartment over said opening for sealing said third compartment;
a first conduit interconnecting said first compartment and said third compartment at said holes; and
a second conduit interconnecting said first compartment and said third compartment at said slots; said conduits provided to circulate air between said compartments.

2. A cowl as defined in claim 1 and including a fan mounted in said third compartment for moving air therein to said first compartment.

3. A cowl as defined in claim 2 wherein said compartments are formed at least in part of heat conducting materials.

4. A cowl as defined in claim 1 including at least one passage formed through the sidewalls of both the first and third compartments.

5. A cowl as defined in claim 4 including sealing disposed around each said passage.

6. A cowl for an industrial truck having a wheel supported chassis, said cowl comprising:
a front wall having a bottom end secured to the chassis and a top end projecting upwardly therefrom;
spaced sidewalls, each secured on one end to said chassis and along an adjacent edge to said front wall;
a top wall secured at its edges to said front wall and said side walls;
a first compartment having an opening formed therein, said first compartment formed from a portion of said front wall, one of said side walls, a portion of said top wall, a first compartment side wall, and a first compartment base wall;
said first compartment side wall having a slot and a hole formed therein and further at least one of said compartment walls having a sealable passage formed therethrough;
a first compartment cover removably secured to said first compartment over said opening;
a third compartment spaced from said first compartment and having an opening formed therein, said third compartment formed from another portion of said front wall, the other of said side walls, a portion of said top wall, a third compartment base wall and a third compartment side wall;
said third compartment side wall having a slot and a hole formed therein and further at least one of said third compartment walls having a sealable passage formed therethrough;
a third compartment cover removably secured over said third compartment opening;

a second compartment disposed between said first and third compartments;

a first conduit interconnecting said slots to form a passageway between said first and third compartments; and a second conduit interconnecting said slots to form a second passageway between said first and third compartments.

7. A cowl as defined in claim 6 and including a fan mounted in said third compartment for circulating air between said first and third compartments.

8. A cowl as defined in claim 7 wherein at least one of said walls of said first and third compartment is formed from a heat conductive material.

* * * * *